United States Patent
Thompson

(10) Patent No.: US 7,401,982 B2
(45) Date of Patent: Jul. 22, 2008

(54) BEARING WITH PASS OR FAIL WEAR GAUGE

(75) Inventor: Stephen Thompson, Edmonton (CA)

(73) Assignee: QA Bearing Technologies Ltd., Edmonton, Alberta (CA)

(*) Notice: Subject to any disclaimer, the term of this patent is extended or adjusted under 35 U.S.C. 154(b) by 281 days.

(21) Appl. No.: 11/179,287

(22) Filed: Jul. 12, 2005

(65) Prior Publication Data
US 2006/0193546 A1    Aug. 31, 2006

(30) Foreign Application Priority Data
Feb. 28, 2005   (CA)  ................................. 2498748

(51) Int. Cl.
    *F16C 19/54*   (2006.01)
(52) U.S. Cl. .................. 384/613; 384/513; 384/516
(58) Field of Classification Search ......... 384/511–516, 384/490, 627, 462–472, 613
See application file for complete search history.

(56) References Cited

U.S. PATENT DOCUMENTS

| | | | |
|---|---|---|---|
| 1,307,493 A * | 6/1919 | Hanson | ................... 384/511 |
| 1,718,848 A * | 6/1929 | Blomquist | ................... 384/511 |
| 3,624,815 A * | 11/1971 | Schweitzer | ................... 384/533 |
| 3,647,268 A * | 3/1972 | Haines | ................... 384/516 |
| 3,797,451 A | 3/1974 | Tiraspolsky et al | |
| 3,804,478 A * | 4/1974 | Andree | ................... 384/615 |
| 3,897,116 A | 7/1975 | Carpenter | |
| 4,120,543 A | 10/1978 | Greene, Jr. et al. | |
| 4,302,963 A | 12/1981 | Collins | |
| 4,336,972 A | 6/1982 | Dagiel | |
| 4,400,041 A | 8/1983 | Lederman | |
| 4,576,499 A | 3/1986 | Smith | |
| 4,780,005 A | 10/1988 | Toyoshima et al. | |
| 4,925,323 A | 5/1990 | Lederman | |
| 4,944,642 A * | 7/1990 | Andersson | ................... 384/516 |
| 5,074,681 A | 12/1991 | Turner et al. | |
| 5,248,204 A | 9/1993 | Livingston et al. | |
| 5,599,112 A | 2/1997 | Klein | |
| 5,690,434 A | 11/1997 | Beshoory et al. | |
| 5,796,349 A | 8/1998 | Klein | |
| 6,100,809 A | 8/2000 | Novoselsky et al. | |

* cited by examiner

*Primary Examiner*—Thomas R Hannon
(74) *Attorney, Agent, or Firm*—Davis Bujold & Daniels, P.L.L.C.

(57) ABSTRACT

A bearing includes an inner race having a rotational axis and an outer race sharing the rotational axis of the inner race. Rolling bearing members are constrained between the inner race and the outer race. A retention lip is provided which is adapted to maintain a peripheral opening of a constant gauge distance between and prevent relative axial movement of the inner race and the outer race. The gauge distance of the peripheral opening is adapted to allow free passage of the rolling bearing members, upon wear on the rolling bearing members reaches a predetermined level. The bearing provides a pass or fail indication, by falling apart when the rolling bearing members have exceeded the predetermined level of wear.

1 Claim, 5 Drawing Sheets

BEARING WITH PASS OR FAIL WEAR GAUGE

This application claims priority from Canadian Application Serial No. 2,498,748 filed Feb. 28, 2005.

FIELD OF THE INVENTION

The present invention relates to a bearing with a wear gauge, which indicates whether the bearing passes or fails.

BACKGROUND OF THE INVENTION

In the field of oil well drilling, bearings from drilling tools are reused. A decision as to whether to reuse or replace a bearing is made by service personnel based upon a visual inspection. On occasion, drilling tools experience premature failure, after servicing. Such premature failure is an indication of an error in judgement on the part of service personnel.

SUMMARY OF THE INVENTION

According to the present invention there is provided a bearing which includes an inner race having a rotational axis and an outer race sharing the rotational axis of the inner race. Rolling bearing members are constrained between the inner race and the outer race. A retention lip is provided which is adapted to maintain a peripheral opening of a constant gauge distance between and prevent relative axial movement of the inner race and the outer race. The gauge distance of the peripheral opening is adapted to allow free passage of the rolling bearing members, when wear on the rolling bearing members reaches a predetermined level.

A bearing constructed in accordance with the teachings of the present invention falls apart once wear on the rolling bearing members exceeds the predetermined level.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
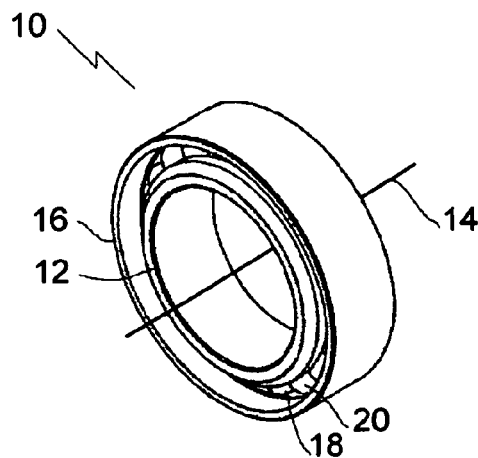
FIG. 1 is a perspective view of a first embodiment of bearing with pass or fail wear gauge constructed in accordance with the teachings of the present invention.

The preferred embodiments of bearing with pass or fail wear gauge, will now be described with reference to FIG. 1 through FIG. 12. A first embodiment, generally identified by reference numeral 10, will be described with reference to FIG. 1 through FIG. 4, and FIG. 9. A second embodiment, generally identified by reference numeral 100, will be described with reference to FIG. 5 through FIG. 8, and FIG. 10. The PRIOR ART will be described with reference to FIGS. 11 and 12.

DESCRIPTION OF PRIOR ART

Figure 11:
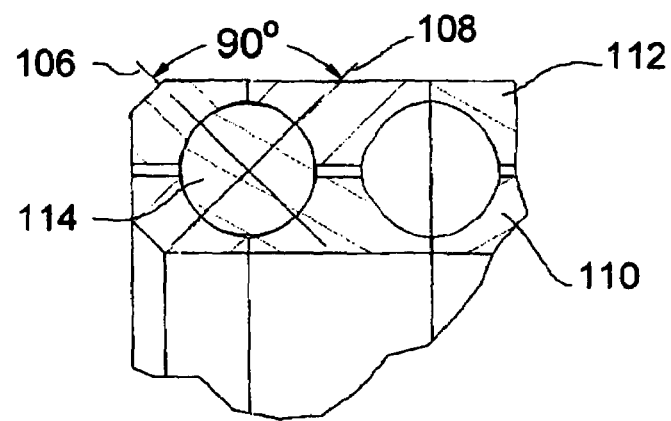
FIG. 11 labelled as PRIOR ART is a detailed section view of a prior art bearing.
Figure 12:
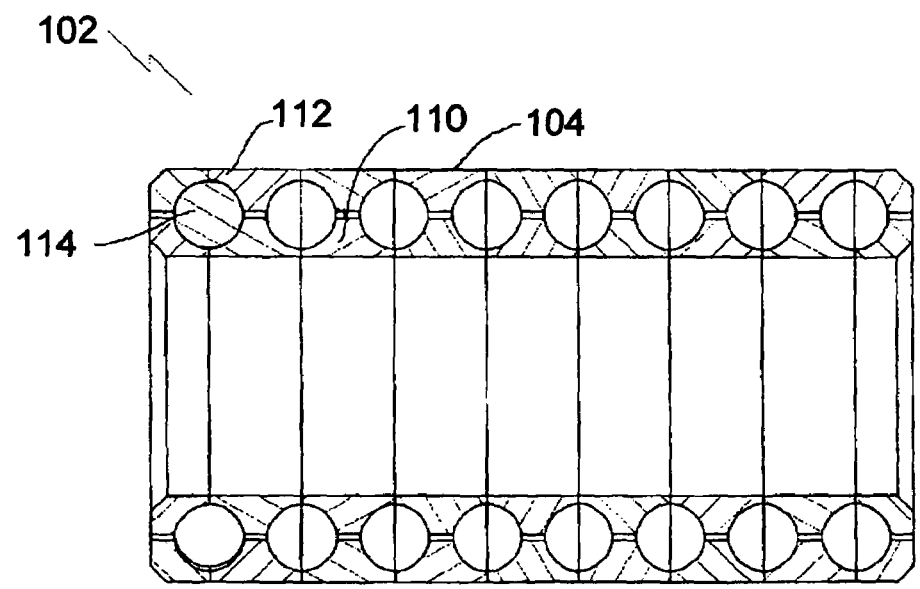
FIG. 12 labelled as PRIOR ART is a section view of a bearing stack made will a plurality of the prior art bearings illustrated in FIG. 11.

Referring now to FIG. 12, the traditional bearing used to take the thrust load in the bearing section of a downhole mud lubricated drilling motor is a stack 102 of full complement four-point angular contact ball bearings 104, shown in detail in FIG. 11, with contact made along lines 106 and 108. Referring again to FIG. 12, this design consists of a number of independent and separable shaft races 110, housing races 112, and loose ball sets 114 that must be matched during initial assembly and continue to be located in their respective relative positions in subsequent motor rebuilds. Stacks with as many as eight, ten, or even twenty rows of loose balls may be required based on the anticipated drilling loads. These balls must be loaded into the properly ordered races during motor assembly and rebuilds. Premature failures often occur when races are "shuffled" or balls of different manufacturing run batch sizes are used in the same assembly. A unitizing bearing, with non-separable components, would create a thrust bearing stack where the need for matching and orientating independent races is eliminated. It would insure that balls of a uniform batch size are used and significantly reduce the technical detail required for handling and assembly of a motor bearing section.

At the present time the only method of determining if the components of a traditional four-point angular contact stack could be reused is by actually rebuilding the stack with new balls and measuring the resulting assembly's endplay. This is a time consuming process that requires attention to detail, the handling of a lot of loose balls, and the possibility of rejecting the parts after all that effort. A quick and simple method is needed to determine if bearing components are to be rejected. By controlling the interference of the retaining lip that unitizes a single angular contact bearing with the effective outer diameter of the assembled balls, a gauge can be created to measure internal wear. Rejection of the bearing is determined when the wear gauge lip no longer maintains a unitized assembly.

Furthermore, a four-point angular contact ball bearing is designed to handle thrust in both directions; therefore, the four raceway shoulders must be high enough to support the ball contact geometry. This symmetric shoulder height reduces the gap permissible between the shaft and housing races, as well as the angle of contact. Traditional designs for four-point angular contact bearings have typical angles of 35° from the vertical plane, however angles as high as 45° have been used in some drilling applications. With a single directional angular contact ball bearing the shoulders do not need to be symmetrical and can be tailored to provide more space for mud flow and to increase the bearing's contact angle. A greater contact angle increases the bearings thrust capacity and reduces the contact stresses while drilling. Wear is reduced and motor life is therefore extended.

Figure 2:
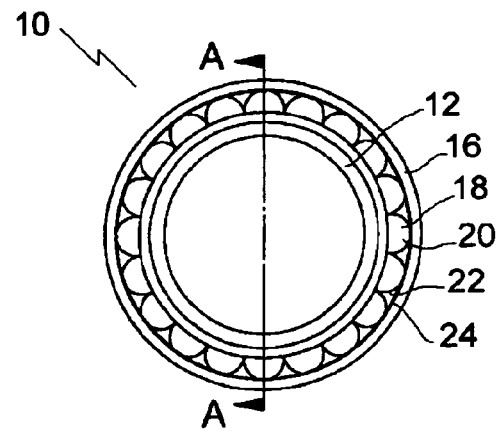
FIG. 2 is a rear elevation view of the bearing illustrated in FIG. 1.
Figure 3:
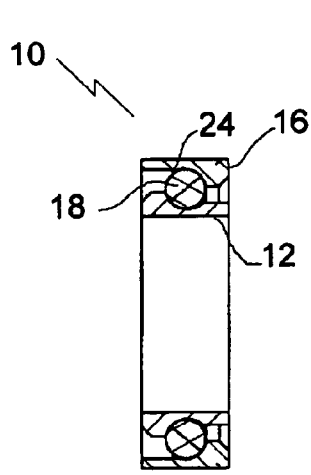
FIG. 3 is a section view of the bearing taken along section lines A-A of FIG. 2.
Figure 4:
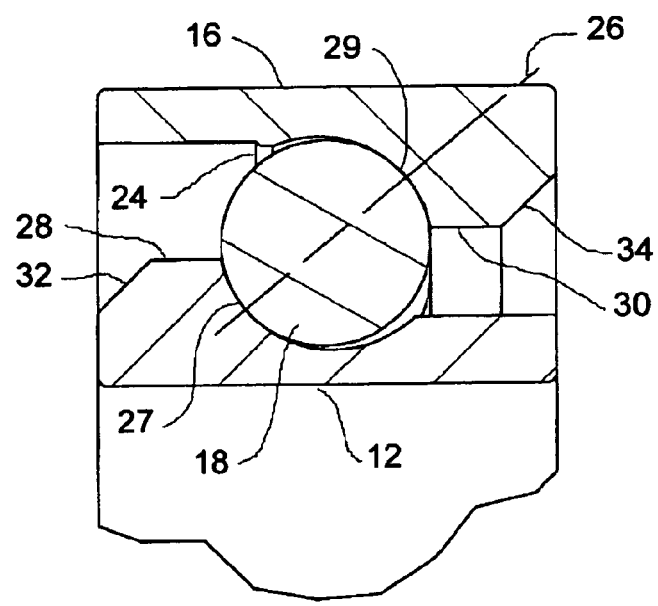
FIG. 4 is a detailed section view of the bearing illustrated in FIG. 3.
Figure 5:
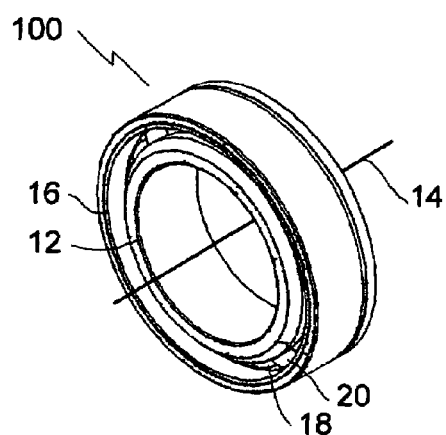
FIG. 5 is a perspective view of a second embodiment of bearing with pass or fail wear gauge constructed in accordance with the teachings of the present invention.
Figure 6:
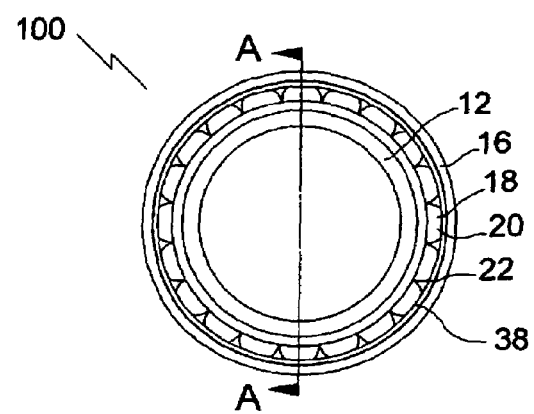
FIG. 6 is a rear elevation view of the bearing illustrated in FIG. 5.
Figure 7:
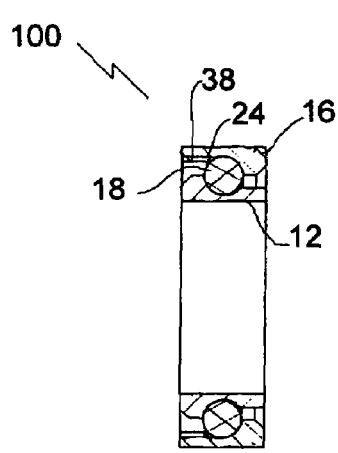
FIG. 7 is a section view of the bearing taken along section lines A-A of FIG. 6.
Figure 9:
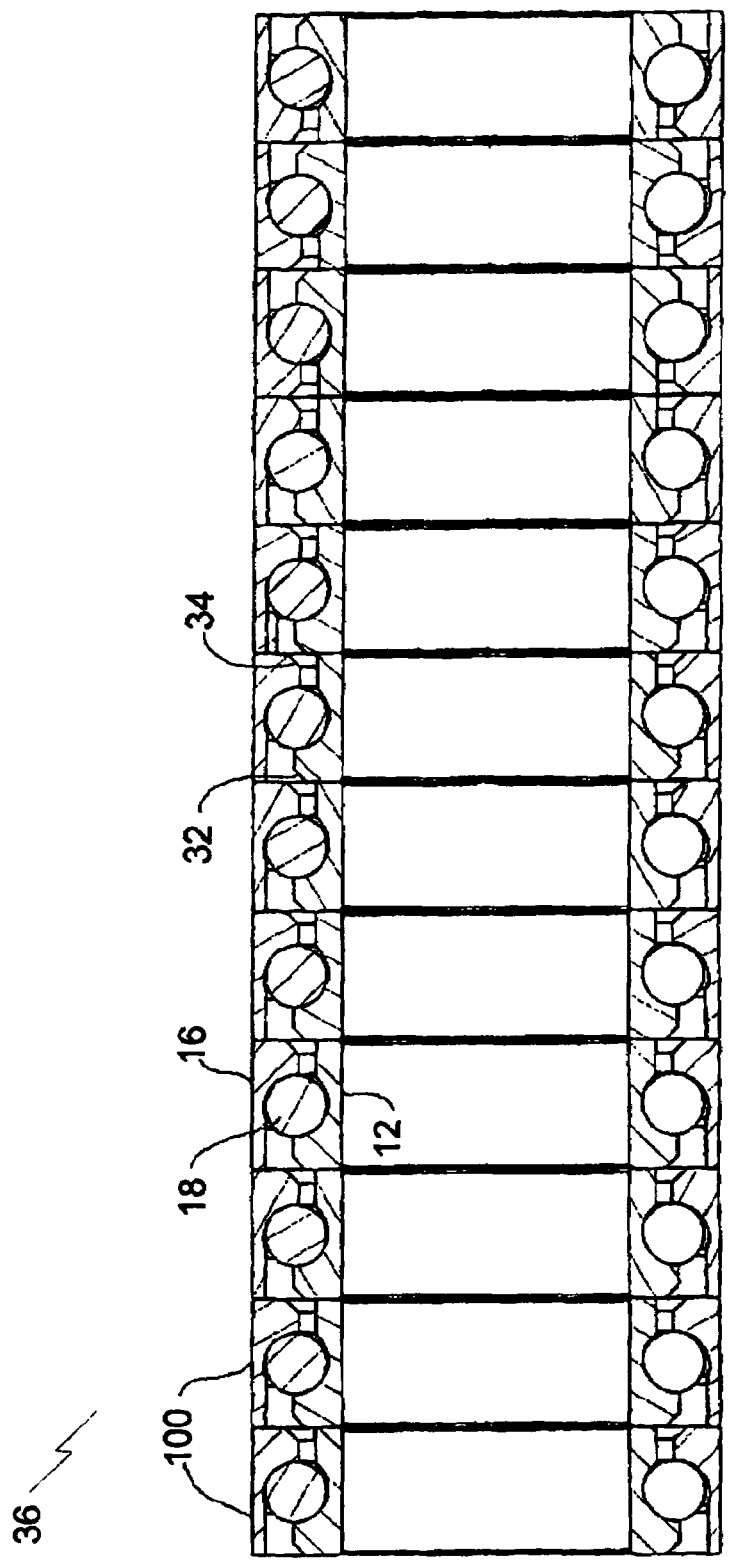
FIG. 9 is a side elevation view, in section, of a bearing stack made with a plurality of the bearings illustrated in FIG. 1 in different orientations to carry both bit load and off-bottom load.
Figure 10:
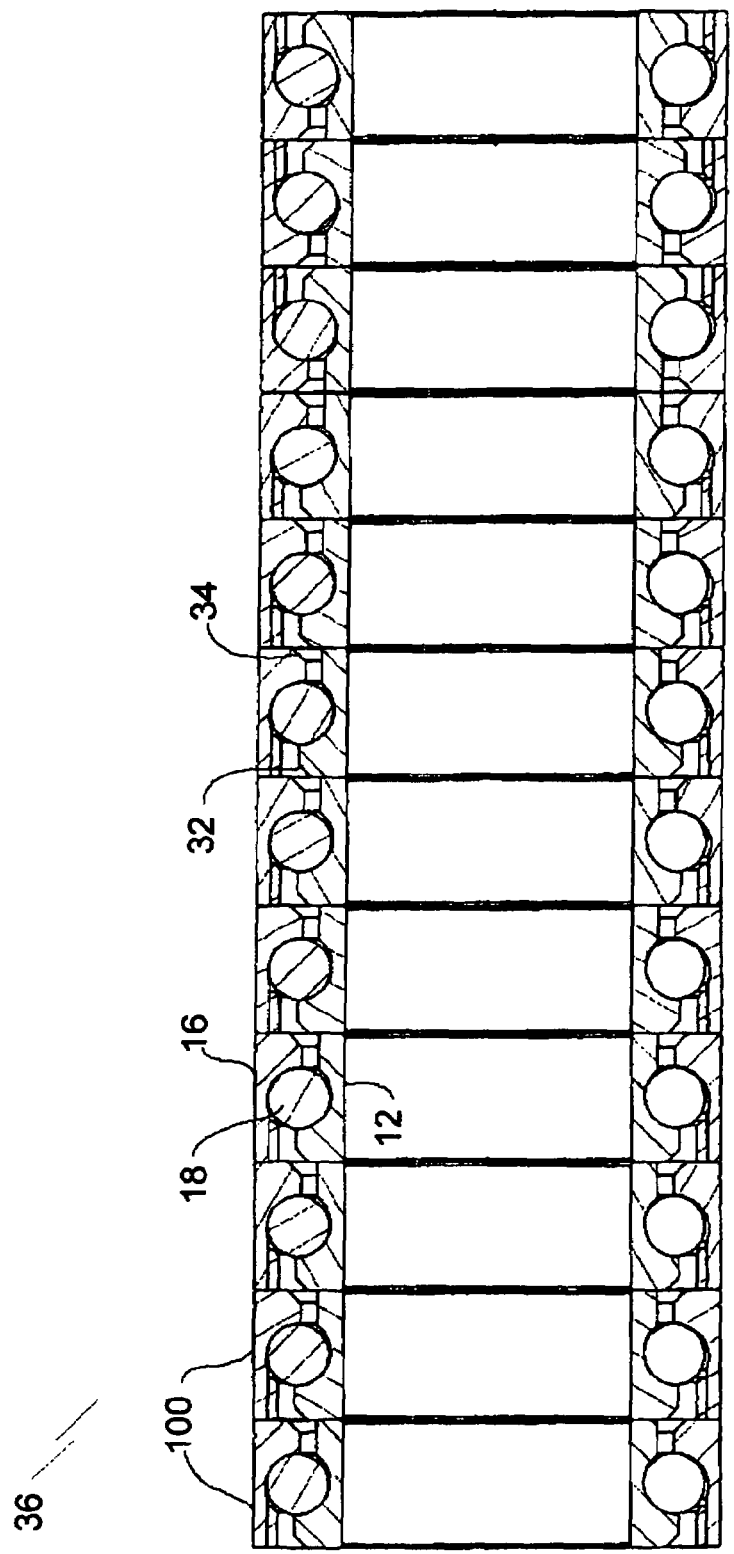
FIG. 10 is a side elevation view, in section, of a bearing stack made with a plurality of the bearings illustrated in FIG. 5 in different orientations to carry both bit load and off-bottom load.

Structure and Relationship of Parts:

Referring now to FIG. 1, there is shown bearing 10. Bearing 10 comprises an inner race 12 that rotates about a rotational axis indicated by line 14, and an outer race 16 that shares rotational axis 14 of inner race 12. Referring to FIG. 2, rolling bearing members 18, such as balls 20, are constrained between inner race 12 and outer race 16. A peripheral opening 22 is provided which serves as a flow gap between inner race 12 and outer race 16 to allow for mud lubrication. Referring to FIG. 3, a retention lip 24 is adapted to prevent relative axial movement of inner race 12 and outer race 16 and maintain peripheral opening 22 at a constant gauge distance. Referring to FIG. 4 rolling bearing members 18 are adapted to bear axial thrust loading in only one direction, along line 26. Rolling bearing members 18 engage contact surfaces 27 and 29 on inner race 12 and outer race 16 respectively, which are tangential to rolling bearing members 18. Tangential contact surfaces 27 and 29 are oriented at a contact angle of approximately 30 degrees in relation to rotational axis 14. The gauge distance of peripheral opening 22 is adapted to allow free passage of balls 20, when wear on balls 20 reaches a predetermined level. Retention lip 24 is shown to be integrally formed on outer race 16, however, it will be understood that it could be formed on either. Exterior load bearing shoulders 28 and 30 of inner race 12 and outer race 12 each have a chamfer 32 and 34, respectively. This is intended to provide a coordinated mating point for formation of a bearing stack indicated generally by reference numeral 36, as depicted in FIG. 9.

Operation:

The use and operation of bearing 10 will now be discussed with reference to FIGS. 1 through 4 and 9. Referring to FIG. 1, bearing 10 is formed as a unitized bearing with inner race 12, outer race 16, and rolling bearing members 18 as described above, with a retention lip 24, seen in FIG. 4. Bearing members 18 engage contact surfaces 27 and 29, and bear the axial thrust loading in only one direction. Bearings 10 are then formed in a stack 36 as shown in FIG. 9 to be used in an oil tool (not shown). After use, bearings 10 are removed from stack 36 for testing. If balls 18 are worn down to a certain size, bearing 10 will fall apart, as balls 20 will be able to pass through the gauge distance set by peripheral opening 22. Otherwise, bearing 10 may still be used.

Figure 8:
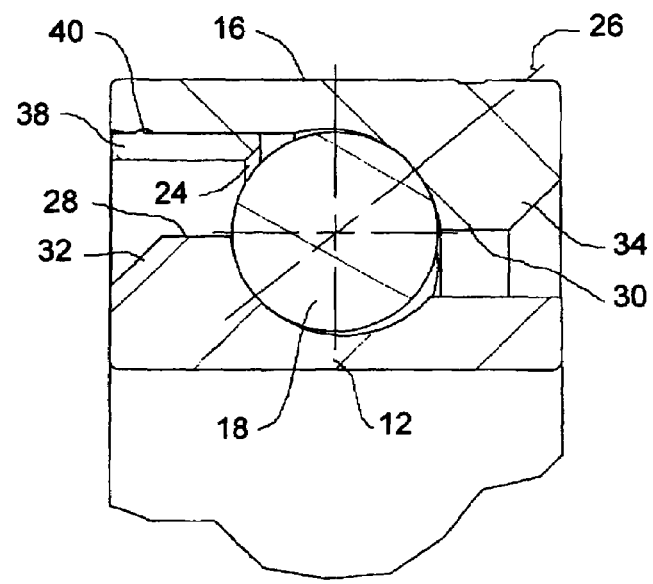
FIG. 8 is a detailed section view of the bearing illustrated in FIG. 7.

Variation:

Referring now to FIGS. 5 through 8, and FIG. 10 an alternative embodiment will be discussed. Bearing 100 is similar to bearing 10 discussed above, however retention lip 24 is now carried on a retaining ring 38, which is discrete from inner race 12 or outer race 16. Referring to FIG. 8, a groove 40 is formed in outer race 16 to secure retaining ring 38.

Cautionary Warnings:

A bearing fabricated in accordance with the teachings of the present invention should be replaced if it falls apart upon removal from the oil tool. It is also recommended that the bearing be replaced if a service technician is able to pull it apart with his fingers.

If one bearing must be replaced in the oil tool, it is recommended that all of the bearings in that oil tool be replaced. The rationale for this recommendation is that when one bearing needs replacing, the other bearings have experienced comparable wear and will not be too far behind.

Care must be taken when setting the threshold level at which the bearing will fall apart. When setting such threshold level, one must bear in mind the length of time between servicing for the oil tool in question. If a typical tool run is 50 hours between servicing, it would not be appropriate to allow a bearing to be reused which only has 5 hours of useful life left. The threshold level is determined by the gauge distance provided by peripheral opening 22.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A bearing comprising:

an inner race having a rotational axis;

an outer race sharing the rotational axis of the inner race;

a plurality of ball bearing members constrained between contact shoulders on the inner race and the outer race which are tangential to plurality of rolling bearing members, the tangential contact surfaces being oriented at a contact angle of approximately 30 degrees in relation the rotational axis, such that the ball bearing members are adapted to bear axial thrust loading in only one direction;

a retention lip only sufficient to maintain a peripheral opening of a constant gauge distance of permissible bearing wear between and prevent relative axial movement of the inner race and the outer race, the gauge distance of the peripheral opening being adapted to allow free passage of the ball bearing members, when wear on the bail bearing members reaches a predetermined level, the peripheral opening also providing a flow gap between the inner race and the outer race to allow for mud lubrication; and the retention lip defining a portion of the tangential contact surface of one of the inner and the outer races, the retention lip being spaced inwardly from a side wall of the bearing and directly engaging with the plurality of ball bearing members to prevent relative movement of the inner race relative to the outer race, in one direction of movement, until at least one of the retention lip and at least some of the plurality of ball bearing members become sufficiently worn to permit such relative movement.

* * * * *